Figures 5, 6, 7:
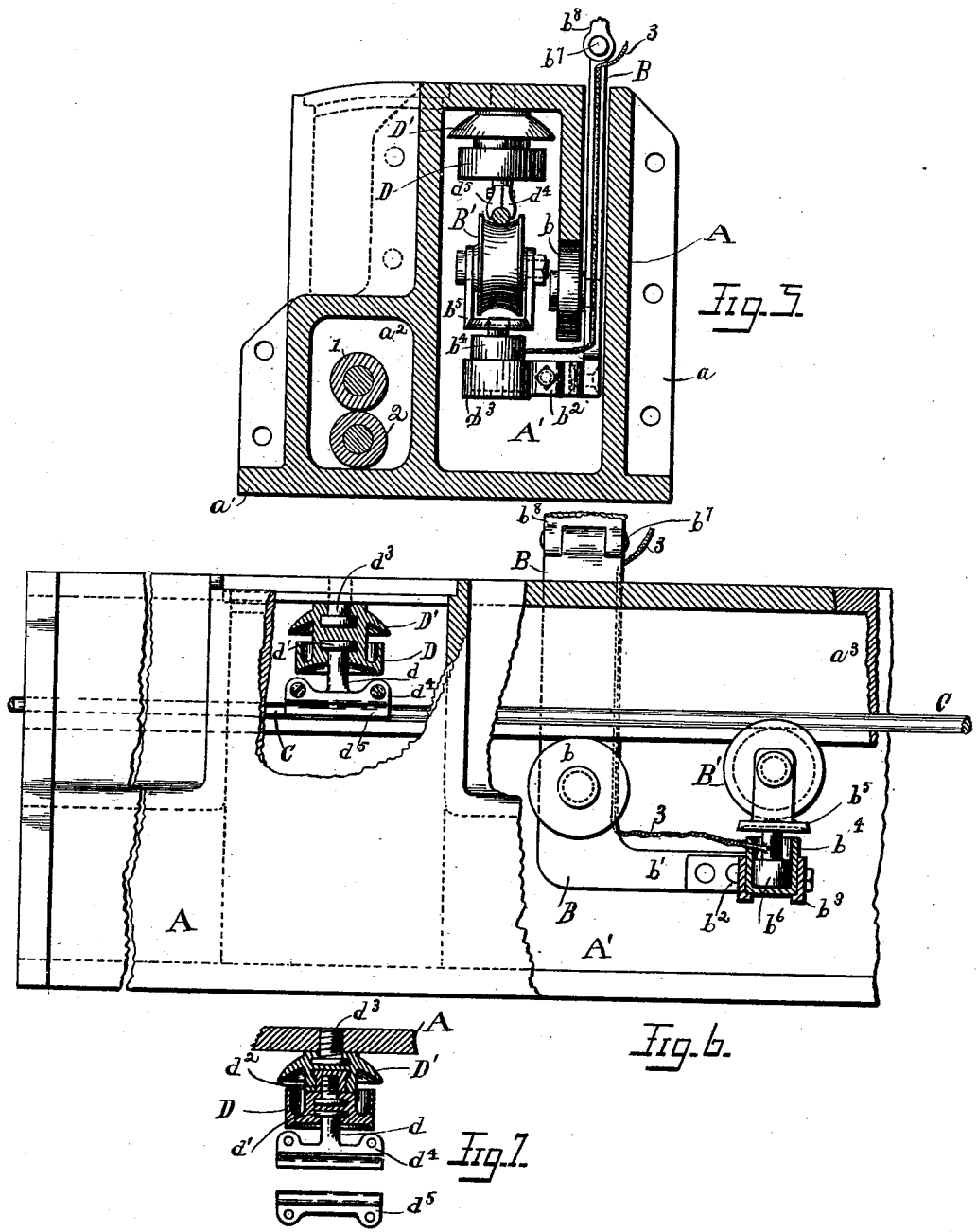

(No Model.) 2 Sheets—Sheet 1.

J. PAWOLOWSKI.
CONDUIT ELECTRIC RAILWAY.

No. 508,236. Patented Nov. 7, 1893.

Witnesses
Ralph C. Enyart
Emma Lyford

Inventor
Jacob Pawolowski
By Geo. J. Murray
Atty

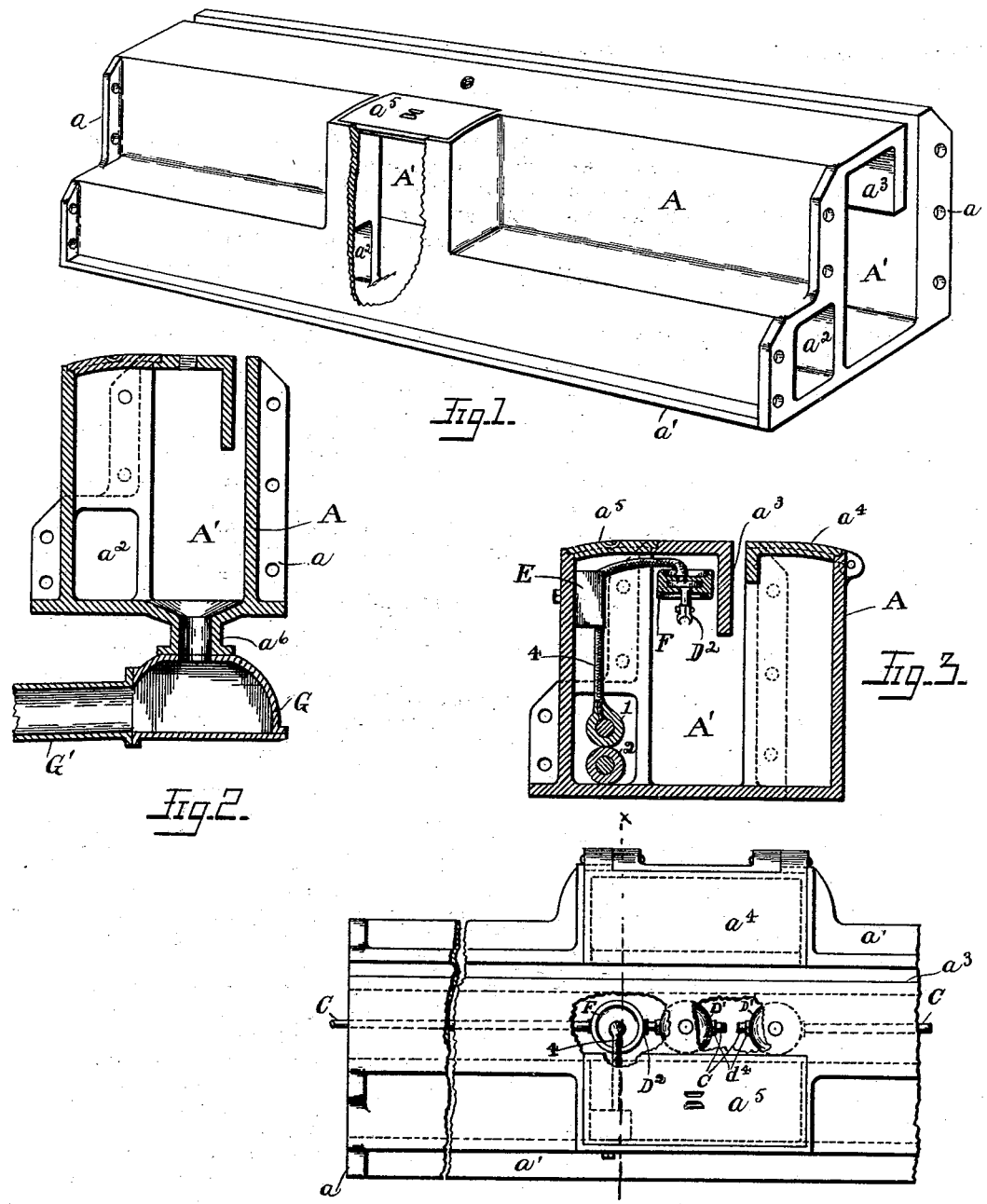

UNITED STATES PATENT OFFICE.

JACOB PAWOLOWSKI, OF CINCINNATI, OHIO.

CONDUIT ELECTRIC RAILWAY.

SPECIFICATION forming part of Letters Patent No. 508,236, dated November 7, 1893.

Application filed February 27, 1893. Serial No. 463,813. (No model.)

*To all whom it may concern:*

Be it known that I, JACOB PAWOLOWSKI, a citizen of the United States, and a resident of Cincinnati, in the county of Hamilton and State of Ohio, have invented a certain new and useful Underground Conduit for Electric Railways, of which the following is a specification.

My invention relates to an underground conduit for electric railways. Its object is to provide an improved means for supporting the trolley wires and insulating them properly and secure a steady motion of the trolley wheels. Its object is also to provide means to render each block or any certain length of line entirely independent of the others, so that should anything happen in one section, or to the trolley of any particular car, by which the current might become short-circuited, the remainder of the line would not be affected and the affected part might be quickly placed in condition without delaying travel over the other portions of the line.

With these objects in view, the invention will be first fully described in connection with the accompanying drawings and then particularly referred to and pointed out in the claims.

Referring to the drawings, in which like parts are indicated by similar reference letters and numerals wherever they occur throughout the various views, Figure 1 is a perspective view of one section of the conduit, with a portion broken away from one side of the manhole and main wire chamber. Fig. 2 is a transverse vertical section through one section of my improvement, showing the means of connecting the conduit with the waste pipe or sewer. Fig. 3 is a transverse vertical section taken through line $x$ $x$ of Fig. 4, showing the main wires, one of the feeders, the fuse box, and the means for connecting the feeder wire and holding the trolley wire in position. Fig. 4 is a plan view of a section of conduit shown in Fig. 3, with a portion of the top broken away to show the feed wire attachment and the arrangement of trolley wires and hangers. Fig. 5 is a transverse section similar to Fig. 2, but with the trolley arm and trolley wheels in position. Fig. 6 is a view, partly in side elevation and partly in broken section, of the view shown in Fig. 5. Fig. 7 is a central vertical section of my preferred form of trolley wire holder or hanger.

The views shown in Figs. 5, 6 and 7 are upon an enlarged scale.

Before proceeding to describe the parts in detail, it should be understood that the conduit is put up in sections laid upon cross ties in the ground, and that the view shown in Figs. 3 and 4 and having the manholes for easy access to the feeding wires and trolley wheel, illustrates the sections of the conduit which are used at certain distances, for instance, at the street crossings, or wherever it is desired to separate the trolley wires to render each block or section of the line independent of the others: while the plain sections with the manholes omitted are used between these sections. And the sections illustrated in Figs. 1, 2, 5 and 6, with only the manhole for access to the main conduit for securing the trolley hangers in place, are used at every third or fourth section, or at such distance as would be required to receive one of the trolley wire hangers to steady the wires in position.

The conduit box A is preferably made of cast iron in suitable lengths, of from ten to twelve feet. The meeting ends have outwardly projecting side flanges $a$, which are perforated to receive screw bolts to fasten the parts together. Any suitable packing may be placed between the joints to keep out moisture. The sections are also formed with base flanges $a'$, so that they may be secured to the cross ties by spikes, in the ordinary manner of securing railway rails.

The chamber $a^2$, running through the entire conduit, is to receive the main line wires, 1 and 2; 1 being the main line, and 2, or any other number of wires, being employed for branch lines leading from the main line. The large chamber A', to receive the trolley arm and wheels, has projecting down into it from the top, a longitudinal flange $a^3$, the under edge of which furnishes a track for the guard wheel $b$, which is journaled upon a stud secured in the trolley arm B, which passes down through a slot in the top of the conduit, and its lower end is formed angular, the angular arm $b'$ extending back in the same plane with the vertical arm, and upon its extreme end is secured an angle plate $b^2$, which has an arm projecting from it under the trolley wire C and is provided with a boss or socket $b^3$ to receive a cup $b^4$, into which cup is fitted the shank of the frame $b^5$, in the upper end of which is journaled the trolley wheel B'. Upon the lower end of the shank is formed a piston $b^6$, which snugly fits within the cup $b^4$. The trolley arm is jointed at $b^7$, above the slot in the conduit, to compensate for lateral movement of the car, and its upper end $b^8$, which is shown broken away, passes to the car in the usual manner, the intention being to have it held up by spring pressure, so that the wheel $b$, will bear upon the under edge of the track and steady the movement of the trolley arm, and keep the wheel B' in contact with the trolley wire until the trolley arm is thrown down by the motorman to break the circuit. The wire 3 leads from the shank of the trolley wheel frame to the motor of the car, its lower end passing through a perforation in the cup $b^4$ and connecting directly to the shank. The cup $b^4$, above the piston $b^6$, is filled with an insulating, moisture proof compound, such as heavy grease, paraffine or oil, and the perforation through the cup $b^4$, through which the motor wire 3 passes, is sealed to prevent the escape of the insulating compound.

The trolley wire holder or hanger, best seen in sectional view Fig. 7, consists of the cup D and the cap D', which are formed of some hard insulating material, preferably molded mica. The cup D is molded around the shank $d$, which has collar $d'$ formed as part of the shank to retain the shank within the cup. A headed bolt is also secured in the cup D and its shank projects some distance above the upper edge of the cup, and is screw threaded to engage a flanged nut $d^2$, which is embedded in the cap D', and there is also embedded in the cap D' a headed screw bolt $d^3$, which screws into the top of the chamber A' to hold the hanger or trolley wire holder in place. The lower end of the shank $d$ has formed integral with it a cross head $d^4$, the lower grooved edge of which forms one member of a clamping jaw. The opposite member of the jaw $d^5$ has perforated lugs similar to the lugs upon the cross head $d^4$. The interior of the clamping jaws is a little more than semi-circular, so that the trolley wire is firmly clamped between these jaws by the bolts passing through the perforated lugs. The cup D is also filled with some moisture proof insulating compound, grease or paraffine, and the cap D' projects over the cup so as to prevent any moisture which should fall upon the top of the cap, reaching the moisture proof material in the cup D.

In the form of hangers shown in Fig. 6, the cup and cap D and D' of the hanger is formed in a single piece instead of in two parts, as shown in Fig. 7, but the form shown in Fig. 7 is deemed preferable.

In Fig. 4 I have shown the relative position of the fuse box, feeding wire and the two trolley wire hangers which are used in the section of conduit which is employed at the crossings, or at such distances as may be desired. It will be noticed that the trolley wire C is broken so as to leave an air space between the two hangers in Fig. 4, the object of this arrangement being to have each block, square or section entirely independent of the main line, so that, instead of having a continuous trolley wire, we have a trolley wire made up of sections.

Referring now to Fig. 3, it will be seen that the main wire is connected to the trolley wire by a feeder, 4, which is connected by a fuse strap in the fuse box E, which may be of ordinary construction. The feeder passes into the main conduit chamber A' and is connected to a trolley wire holder $D^2$, similar to the trolley holders $d^3$, $d^4$ and $d^5$, which depend from the cup D. The trolley wire holder is secured in an insulating button or washer F, the upper portion of which is recessed to form an oil chamber, and the feeder wires are connected with the head of the metallic holder $D^2$.

The purpose of employing the feeder wires for each independent section and having a fuse box interposed is, that if, from any cause, any one section of the wires should become short circuited or out of order, the fuse strap interposed in the feeder wire would blow out and only disable that section of the wire without interfering with the other sections. In case there should be such short circuiting as to blow the fuse in any one section, the section of the trolley wire in that section would, of course, be dead. The car could then be pushed along to the section of the conduit shown in Figs. 3 and 4, when the cover $a^4$ could be raised, the trolley lifted out or repaired, the cover $a^5$ lifted out and the blown out fuse removed from the fuse box E and a new one inserted. The disabled car could then be pushed along to the end of the line by the car following it without in any way interfering with any of the other cars upon the same line.

In Fig. 2 I have shown a section of conduit having a downwardly projecting flanged pipe $a^6$, which connects to a union G, to which union is connected a pipe G' which may lead to any drain or sewer. The purpose of this arrangement is to drain any water that may get into the conduit and these draining sections of the conduit may be placed at any suitable distance apart, as desired.

It is obvious that many modifications and mechanical changes may be made in the conduits and the other parts shown, without departing from the spirit and scope of my invention, and hence I do not limit myself to the specific construction shown, but would consider any mere mechanical changes as within the spirit and scope of my invention.

What I claim as new, and desire to secure by Letters Patent, is—

1. The combination, in an underground conduit for electric railroads, of the plain sections and interposed manhole sections having a continuous slot for the trolley arm, the downwardly projecting flange upon one side of said slot, the upwardly spring pressed trolley arm, the guard wheel carried by said arm and bearing normally upon the under edge of said flange, the trolley wire, hangers for supporting it from the top of the conduit, the main wire, and the feeders connecting the main and trolley wires, substantially as set forth.

2. In an underground conduit for electric railways, the combination of the longitudinally slotted conduit, an inwardly projecting flange or track for the trolley guard wheel, the upwardly spring pressed trolley, the guard wheel carried by the trolley and held normally against the said flange or track, the insulated hangers depending from the top of the conduit, the trolley wires carried by said hangers, the main wires and the feeders connecting the main and trolley wires, substantially as hereinbefore set forth.

3. The underground conduit, the continuous main wires and sectional trolley wires within it, the insulating hangers depending from the conduit and supporting the sections of trolley wires, two of said hangers supporting the opposite ends of the sectional trolley wires in proximity to each other at the termini of the sections, and the feeders connecting the main wire and each section of the trolley wire, substantially as shown and described.

4. The underground conduit, the continuous main wire and divided sectional trolley wires within it, insulated hangers depending from the conduit and supporting the trolley wire sections, the trolley held normally in contact with the sectional trolley wires, the feeders connecting the main wire and each section of the trolley wire, and the fuse box interposed in the feed wire between the main wire and the trolley wire, combined and arranged substantially as and for the purpose set forth.

5. The combination of the longitudinally slotted underground conduit, the trolley extending into it, a grease cup secured to the inner end of the trolley arm, the trolley wheel holder supported by said cup, and the trolley wheel journaled in said holder, substantially as shown and described.

6. An insulated moisture proof hanger for underground trolley wires consisting of the wire holder depending from the cup of insulating material, the bolt secured in said insulating cup for securing the hanger to the conduit, said bolt and wire holder having a web of insulating material between them and the moisture proof filling, as grease or paraffine, in said cup.

7. In a hanger for underground trolley wires, the combination of the cup D, the insulating material, the wire support embedded in said cup and depending therefrom, the screw bolt projecting from said cup, the cup cover D' having embedded within it a nut to engage the screw projecting from the cup, and the bolt projecting from it for securing the hanger in place, substantially as shown and described.

8. The combination of an underground conduit, the line wires and trolley wires therein, the feeder connecting the main wire and trolley wire, and the buttons F to insulate the feeders from the conduit, substantially as shown and described.

JACOB PAWOLOWSKI.

Witnesses:
GEO. J. MURRAY,
EMMA LYFORD.